G. MAGALDI.
METALLIC ELASTIC TIRE FOR VEHICLES.
APPLICATION FILED AUG. 16, 1906.

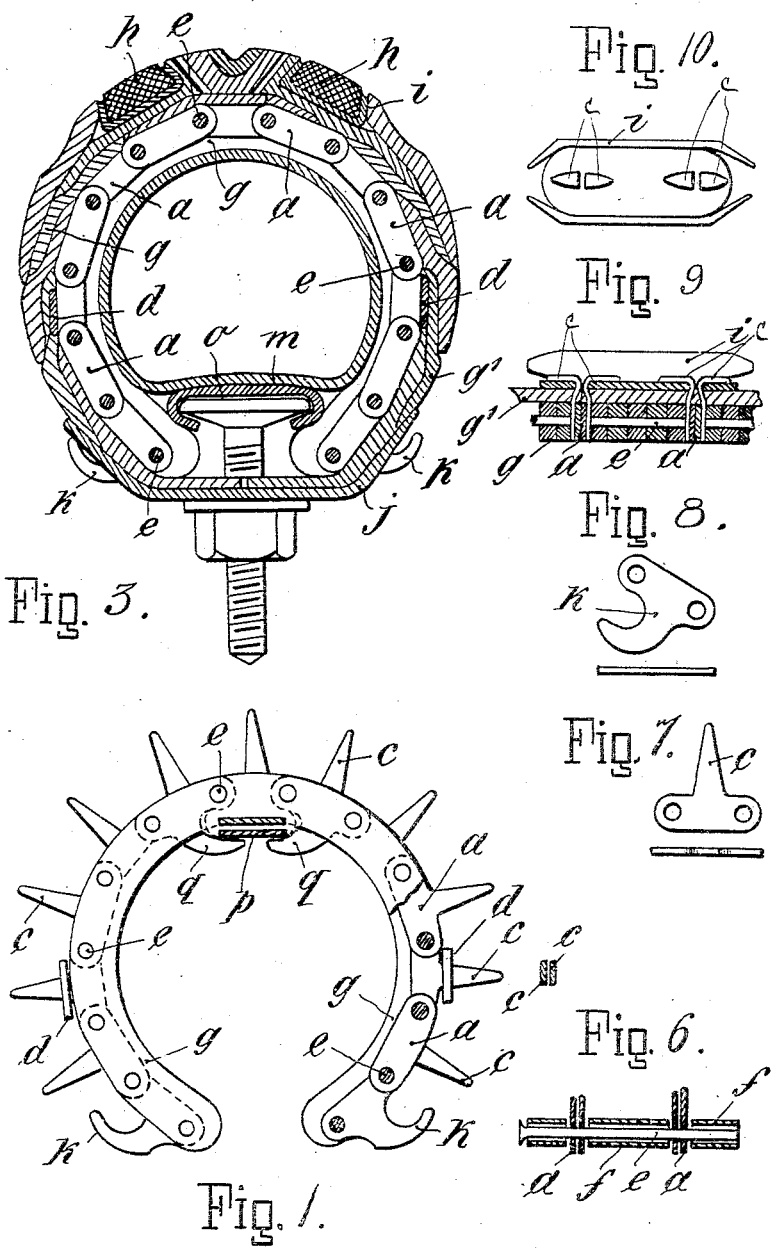

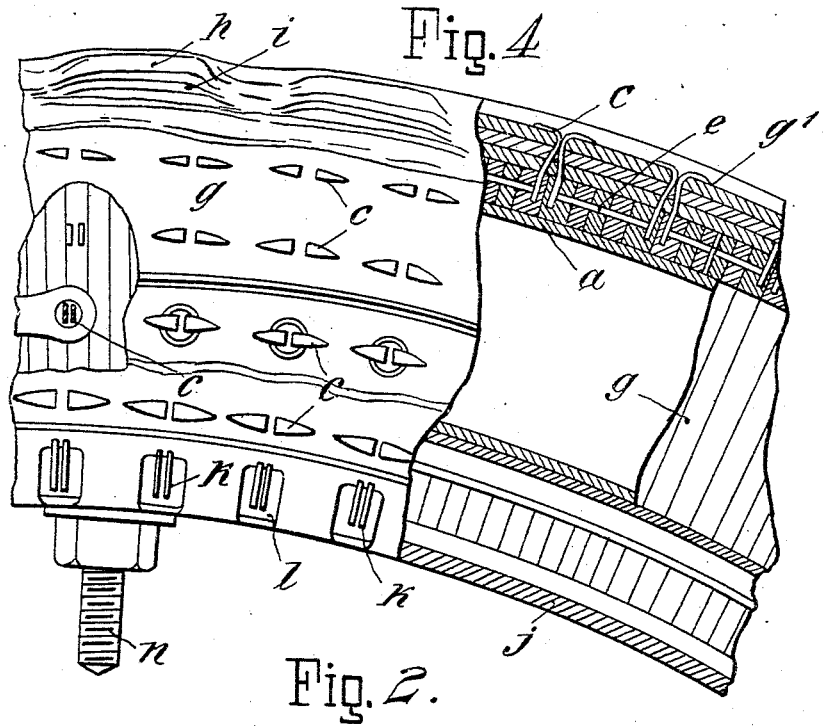
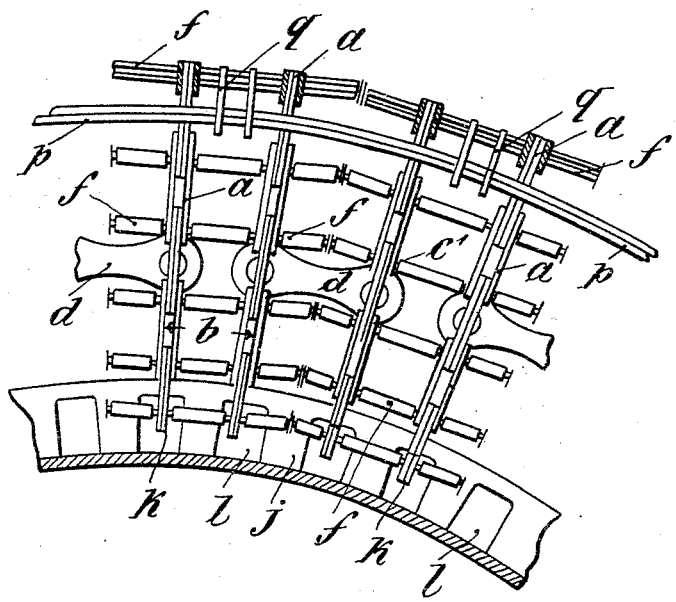

936,142.

Patented Oct. 5, 1909.

3 SHEETS—SHEET 3.

Witnesses:—

Inventor—
G. Magaldi
by
Attorneys

UNITED STATES PATENT OFFICE.

GIULIO MAGALDI, OF BUCCINO, NEAR SALERNO, ITALY.

METALLIC ELASTIC TIRE FOR VEHICLES.

936,142.   Specification of Letters Patent.   Patented Oct. 5, 1909.

Application filed August 16, 1906. Serial No. 330,837.

*To all whom it may concern:*

Be it known that I, GIULIO MAGALDI, mechanist, a subject of the King of Italy, residing at Buccino, near Salerno, in the Kingdom of Italy, have invented new and useful Improvements in Metallic Elastic Tires for Vehicles, of which the following is a specification.

My invention relates to elastic tires for vehicles of all kinds and refers especially to that class of tires in which metallic link chains lying in planes laid through the axis of the wheel transversely to the tire and fixed to the felly of the same are used.

According to this invention the link chains or groups of link chains (hereinafter referred to as elements) are arranged with spaces between them to provide a skeleton for attachment of the covering material thereto, and for this purpose the link chains are provided with means for fixing this material upon and between them. These means may consist of points or tongues projecting from the chain links which points or tongues in the case where groups consisting of several chains are used may be preferably arranged side by side on adjacent links so that they may be bent over to different sides to secure the covering material. The elements may be spaced one from the other by means of stay-bolts or washers attached to the chain links preferably by means of said points or tongues. By these and other features, which will be developed in the specification hereinafter, a simple and strong tire is provided which is comparatively inexpensive to manufacture and of light weight.

Figure 5:
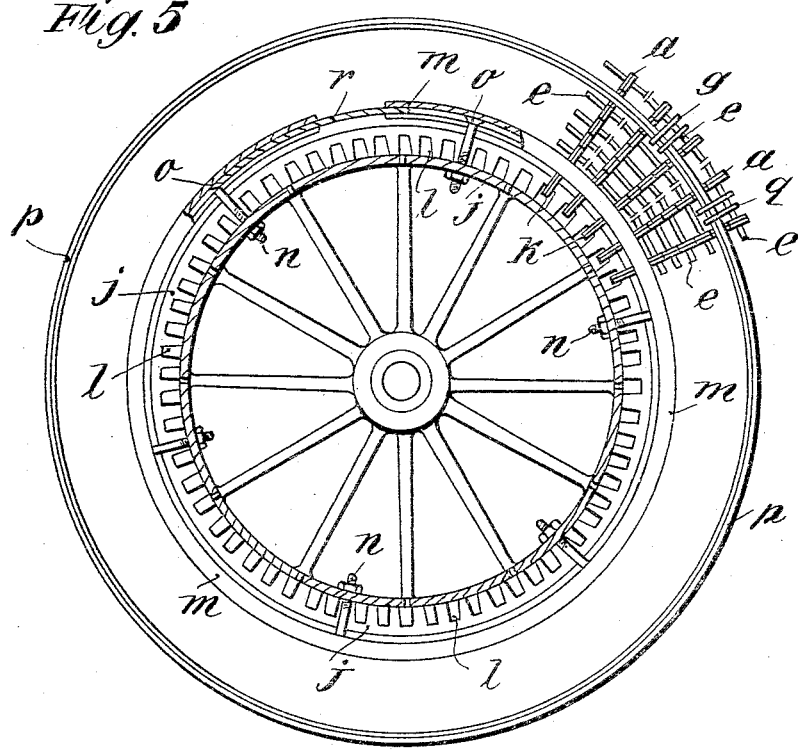
Figure 11:
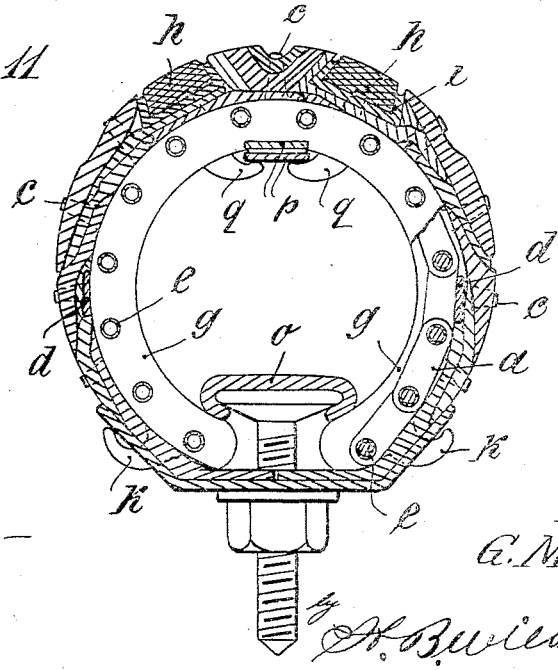

Having reference to the accompanying drawings, Figure 1 is a single element of the tire formed by a link chain in front elevation parts of the chain being covered by the filling material inserted between the elements; Fig. 2 is a part of a wheel tire constructed according to the present invention in section through the middle plane of the wheel, the tire being seen from the inside; Fig. 3 is a cross section through a modified form of the tire taken in a plane through the axis of the wheel between two neighboring link chain elements and showing such an element in front elevation; Fig. 4 is a side elevation of a part of the tire according to Fig. 3 with parts broken away and partially in section; Fig. 5 is a section through the middle plane of a wheel provided with a part of the tire skeleton composed of the link chain elements; Fig. 6 is a sectional view of the stay-bolt like connecting means of the chain elements; Fig. 7 is a single chain link in side elevation and top view respectively; Fig. 8 is a similar view of special form of chain links; Fig. 9 is a part of the tire as represented in Fig. 3 in longitudinal section through a socket of this tire with parts omitted; Fig. 10 is a top view of a socket of the tire according to Fig. 3; Fig. 11 is a transverse vertical section showing the complete outer cover applied about the chain shown in Fig. 1.

The link chains constituting the elements of the tire consist of links $a$ as shown in Fig. 7 in detail. Each of these links $a$ has a point or tongue $c$ projecting outwardy from the tire when the chains are in position. The single links $a$ of each chain are flexibly connected one with the other by means of pins $e$. Preferably the neighboring links $a$ of the chains are arranged side by side with their bores coaxial so that both links may be connected by one pin as well as one to the other as to the corresponding links of the neighboring chains. The outmost links of each chain are provided with hooks $k$, as represented in Fig. 8. These hooks $k$ engage openings of the felly $j$ and thereby fix the link chains to the wheel.

The link chains attached to the wheel felly form together the skeleton of a continuous hollow tire. In the interior of this skeleton may be arranged elastic rings $p$ to stiffen the entire tire. These rings are held by means of hooks $q$ which may be integral with some of the chain links $a$ as shown in Fig. 1. In the form of the tire represented in Figs. 2 and 6 tubes $f$ are slipped over the joint pins $e$. These tubes serve to hold the neighboring link chains suitable distances one from the other. For the same purpose the links of neighboring chains may be connected by means of washers $d$ with two openings which are shifted over the points $c$ of the links to be connected.

A metallic ring $m$ may be arranged within the hollow skeleton formed by the link chain elements which surround the felly concentrically. The side edges of this ring $m$ are bent inwardly as may be seen in Fig. 3, and the ends of the ring are connected by means of a flat metallic piece $r$ which is inserted into the space between these ends and which is held by the bent edges of the ring $m$, as shown in Fig. 5. In the space formed by the underside and by the bent edges of the ring $m$ there are arranged the heads $o$ of screw bolts $n$. These bolts are passed through openings of the felly $j$ and are held by nuts screwed upon their projecting ends. By tightening these nuts the ring $m$ may be pressed more strongly to the adjacent ends of the link chains to secure the engagement of the hooks $k$ of the latter with the openings $l$ of the felly more positively.

Between the link chain elements narrow strips $g$ of flexible material, as leather or fabric are arranged which completely fill the spaces between the elements and these strips $g$ are shifted over the pins $e$ and thereby held in position and they may be covered with other strips $g'$ also of flexible material. These strips $g$ are preferably arranged longitudinally and are fixed to the tire by means of the points $c$ which pass through the strips and are bent over the different sides.

As shown in Fig. 3 some of the points or tongues $c$ may serve to hold sockets $i$ containing pieces $h$ of metal, wood, leather or the like for the purpose of protecting the tire against wear and increasing its adhesion to the ground. The sockets $i$ are represented in detail in Figs. 9 and 10 in which however the pieces $h$ are omitted. As may be seen from these figures the sockets $i$ are fixed to the tire also by means of points $c$ passed through slits of the bottom of said sockets and being bent over to different sides.

The described construction with the elastic ring $p$ arranged in the interior may be used as an elastic tire itself or it may serve as cover for a usual pneumatic tube.

I claim as my invention:—

1. A wheel tire consisting of elements arranged in planes transversely to the tire, said elements consisting of a plurality of link-chains attached to the wheel rim and being arranged with spaces between them, said elements being provided with means for attaching covering material upon and between them.

2. A wheel tire consisting of elements arranged in planes transversely to the tire, said elements consisting of link-chains attached to the wheel rim and being arranged with spaces between them, the chain-links being provided with radial points or tongues projecting outwardly therefrom and adapted to serve as supports and fastening means for the outer covering.

3. A wheel tire consisting of elements arranged in planes transversely to the tire, said elements consisting of link-chains attached to the wheel rim and being arranged with spaces between them, said chain links being provided with radial points or tongues projecting outwardly therefrom, said points or tongues being adapted to serve as supports and fastening means for the outer covering, two adjacent series of said links near the center of said link-chains being provided with inwardly projecting hooks, and a strap consisting of elastic rings within said hooks, said rings being adapted to press the link-chains outwardly.

4. A wheel tire consisting of elements arranged in planes transversely to the tire, said elements consisting of link-chains attached to the wheel rim and being arranged with spaces between them, said chain-links being provided with radial points or tongues projecting outwardly therefrom, said points or tongues adapted to serve as supports and fastening means for the outer covering, and said elements being held a proper distance from each other by means of stay-bolts and washers, said washers connecting two points or tongues of neighboring elements.

5. A wheel tire consisting of elements arranged in planes transversely to the tire, said elements consisting of link-chains attached to the wheel rim and being arranged with spaces between them, said chain-links being provided with radial points or tongues projecting outwardly therefrom, said points or tongues being adapted to serve as supports and fastening means for the outer covering, and said elements being held a proper distance from each other by means of stay-bolts, strips of flexible material arranged between said elements and held in position by said stay-bolts and suitable material covering said material and said elements and being fastened by means of said points or tongues.

6. A wheel tire consisting of elements arranged in planes transversely to the tire, said elements consisting of link-chains attached to the wheel rim and being arranged with spaces between them, the chain-links being provided with radial points or tongues projecting outwardly therefrom, the neighboring link-chains being connected one with the other by means of their joint pins, said pins being of such length as to pass through the bores of the chain links of neighboring elements, stay-bolt like tubes shifted over said joint pins and washers shifted over two points or tongues of such neighboring elements, which are not connected by means of said joint pins.

7. A wheel tire consisting of elements arranged in planes transversely to the tire, said elements comprising link chains attached to the wheel rim and arranged with spaces between them, said chain links being provided with radial points or tongues projecting outwardly therefrom, the neighboring link chains being connected one with the other by means of joint pins and stay bolt like tubes shifted over said points for holding said elements a proper distance from each other.

8. A wheel tire consisting of elements arranged in planes transversely to the tire, said elements comprising link chains attached to the wheel rim and arranged with spaces between them, said chain links being provided with radial points or tongues projecting outwardly therefrom, said elements being held a proper distance from each other by means of washers connecting two points or tongues of adjacent elements one with the other, the spaces between the single elements and between said points and tongues being filled by suitable material such as leather.

Dated this 27th day of July, 1906.

GIULIO MAGALDI.

Witnesses:
ROBERTO MELFASELLE,
NICOLA TETI.